US008204001B2

(12) United States Patent
Sendra Alcina et al.

(10) Patent No.: US 8,204,001 B2
(45) Date of Patent: *Jun. 19, 2012

(54) METHOD FOR PREVENTING OVERLOAD IN MOBILE TELEPHONE NETWORKS BY USING 'ALWAYS-ON' IN THE CASE OF A CALL FROM A MOBILE TELEPHONE

(75) Inventors: Jose Carlos Sendra Alcina, Madrid (ES); Miguel Angel Touset Rios, Madrid (ES)

(73) Assignees: Vodafone Group PLC, Newbury, Berkshire (GB); Vodafone Espana, S.A., Alcobendas, Madrid (ES)

( * ) Notice: Subject to any disclaimer, the term of this patent is extended or adjusted under 35 U.S.C. 154(b) by 150 days.

This patent is subject to a terminal disclaimer.

(21) Appl. No.: 12/594,811

(22) PCT Filed: Apr. 3, 2008

(86) PCT No.: PCT/ES2008/000203
§ 371 (c)(1),
(2), (4) Date: May 25, 2010

(87) PCT Pub. No.: WO2008/119861
PCT Pub. Date: Oct. 9, 2008

(65) Prior Publication Data
US 2010/0246381 A1    Sep. 30, 2010

(30) Foreign Application Priority Data

Apr. 3, 2007 (ES) .................................. 200700880

(51) Int. Cl.
*H04W 4/00* (2009.01)
(52) U.S. Cl. ....................................................... 370/328
(58) Field of Classification Search .......... 370/328–339, 370/342, 349, 389, 395.5–395.52
See application file for complete search history.

(56) References Cited

U.S. PATENT DOCUMENTS

| 7,787,858 | B2 | 8/2010 | Koskinen et al. |
| 2003/0220900 | A1* | 11/2003 | Gabor .............................. 707/1 |
| 2005/0117591 | A1 | 6/2005 | Hurtta et al. |
| 2005/0238002 | A1 | 10/2005 | Rasanen |
| 2006/0045071 | A1 | 3/2006 | Vimpari et al. |
| 2006/0140149 | A1 | 6/2006 | Kim et al. |
| 2006/0165059 | A1 | 7/2006 | Batni et al. |
| 2006/0174009 | A1 | 8/2006 | Martiquet |
| 2008/0192733 | A1 | 8/2008 | Song et al. |
| 2008/0198861 | A1 | 8/2008 | Makela |
| 2008/0205379 | A1 | 8/2008 | Naqvi |
| 2008/0259887 | A1 | 10/2008 | Naqvi |
| 2009/0247137 | A1 | 10/2009 | Awad |
| 2009/0296630 | A1 | 12/2009 | Chen et al. |

FOREIGN PATENT DOCUMENTS

WO    2007/022791    3/2007

OTHER PUBLICATIONS

3GPP TS 23.060 V3.5.0, 3rd Generation Partnership Project; Technical Specification Group Services and System Aspects; General Packet Radio Service (GPRS); Service description; Stage 2, 181 pp. 2000.*
U.S. Appl. No. 12/594,813, filed Apr. 29, 2010, Sendra Alcina et al.
3GPP TS 23.228 V7.7.0 (Mar. 2007) 3rd Generation Partnership Project; Technical Specification Group Services and System Aspects; IP Multimedia Subsystem (IMS); Stage 2 (Release 7) [Online] Mar. 2007, XP002496281, Retrieved from the Internet: URL:hhtp://www.3gpp.org/ftp/Specs/html-info/23228.htm> [retrieved on Sep. 17, 2008].
U.S. Appl. No. 12/594,813, Oct. 27, 2011, Notice of Allowance.

* cited by examiner

*Primary Examiner* — Frank Duong
(74) *Attorney, Agent, or Firm* — Workman Nydegger

(57) ABSTRACT

A method for preventing overload in telecommunications networks with IMS by always-on for a call generated by a user, in which process the user makes a PDP Context request and a GGSN of said network provides a free IP address to him or her and the PDP Context becomes active. An S-CSCF of the network creates a record in which an association between the IP address and a characteristic identity of the IMS network is included. When the GGSN is going to deactivate the PDP Context for having been inactive for a preestablished time, an indication of such deactivation is sent to the IMS client which maintains the characteristic IMS identity-IP address association and marks it as fictitious. When the user generates a new call, the IMS client informs the UMTS terminal about the characteristic IMS identity-IP address association marked as fictitious, and the UMTS terminal sends a PDP Context request message, in which message the IP address of the IMS association is included.

4 Claims, No Drawings

METHOD FOR PREVENTING OVERLOAD IN MOBILE TELEPHONE NETWORKS BY USING 'ALWAYS-ON' IN THE CASE OF A CALL FROM A MOBILE TELEPHONE

FIELD OF THE INVENTION

The invention is comprised within the field of mobile telecommunications, and more specifically in how static overload in SGSN and GGSN can be prevented when PDP Context with always-on needs are required for real time services such as IMS.

BACKGROUND OF THE INVENTION

It is known that abbreviations and acronyms are frequently used in the mobile telephony field. A glossary of acronyms/terms which are used throughout the present specification is set forth below:
APN Access Point Name
CS Circuit Switching
GGSN Gateway GPRS Support Node
GPRS General Packet Radio Service
IMS IP Multimedia Subsystem
MO Mobile Originated
PDP Packet Data Protocol
PS Packet Switching
S-CSCF Serving Call Session Control Function
SGSN Serving GPRS Support Node
SIP Session Initiation Protocol
UMTS Universal Mobile Telecommunications System Always-on is an old and well known problem in the PS environment. Theoretically, any user who executes a PDP Context Request (makes a request for a new context) and receives a positive response, is using IP resources in an always-on manner, i.e. always present and assigned, even if the user does not generate any IP data traffic. The type of resources used has more of a static character (IP address, memory load in the nodes, etc.) than a dynamic character (radio channels, etc.), however even so it is a question of scarce resources. In fact current GGSNs are configured to close any PDP Context without activity for the purpose of saving the maximum number of resources as possible. The element defining which inactive PDP must be closed is the APN with which the access is carried out.

When the IMS system is adopted on a large scale, it is possible that a paradoxical situation occurs. The use of the IMS for real time services implies an assumption of total reachability of the user at any time and in any place, with a view to maintaining the same level of service which the user currently has with CS. That means that the PDP Context for SIP signaling used by the user must always be available (from the IMS point of view, closing the signaling context means deregistering the user de facto), even if the inactivity of the user is extended for a long time. Therefore the IMS requirements will only worsen the problem of consuming IP resources without real associated traffic.

Before explaining the proposed solution to this problem by means of the present invention, what would occur with the current situation is described below. It is assumed that there is an IMS user already registered in the system and with active signaling context, therefore he or she is capable of initiating and receiving calls. If the GGSN decides to close that signaling PDP Context because the user has not carried out any additional interaction with the network, the user would pass to a status similar to that of deregistered, being unable to initiate or receive any call until requesting a new context and registering again in the system. This implies additional signaling and furthermore the expected delay upon setting up any type of call increases.

DESCRIPTION OF THE INVENTION

The use of the resources which the always-on model will impose on the PS infrastructure when the IMS is adopted is lightened by means of the method of the present invention.

The proposed invention is based on the concept of layer separation, which means breaking the dependence between what occurs to the PDP Context and the status of the user in the IMS network.

A first aspect of the present invention relates to a method for preventing overload in telecommunications networks with IMS by always-on for a call generated or initiated by a user (or outgoing call), an IMS terminal of said user being formed by a UMTS terminal and an IMS client. According to the method:
  said user makes a PDP Context request and a GGSN of said
    network provides said user with a free IP address and the
    PDP Context becomes active; and in which
  an S-CSCF of the IMS network creates a record in which an
    association between said IP address and a characteristic
    identity of the IMS network is included;
According to the invention, the method comprises the steps of:
  when the GGSN is going to deactivate said PDP Context
    for having been inactive for an established period of
    time, an indication of such deactivation is sent to the
    IMS client which maintains said characteristic IMS
    identity-IP address association and marks it as fictitious;
    and,
  when said user generates a new call, the IMS client informs
    the UMTS terminal about the characteristic IMS identity-IP address association marked as fictitious, and the
    UMTS terminal sends a PDP Context request message,
    in which message the IP address of said IMS association
    is included in a predetermined field.
  If said IP address of the association is still free in the GGSN
  it is preferably reassigned to the user;
    and if said IP address has been assigned to another user, a
      restart is carried out after the failure of the call attempt.
  Preferably in the GGSN, when an IP address is freed it is
  saved in the last position of an IP address line.
  Said determined field is preferably a field of the PDP Context request message in which the assignment a specific IP
  address can be requested from the network.
  Therefore a solution to the situation previously set forth is
  provided by means of the present invention, fulfilling the
  following objectives:
    The network continues to be able to close largely inactive
      PDP Context.
    The user can be reached for any outgoing call-originated by
      the mobile—in real time.
    The solution minimizes the necessary signaling.
    The solution does not require new developments or adoption of new elements in the architecture. In fact, the use
      of protocols and functionalities currently implemented
      or expected to be incorporated to the network in the near
      future is desirable.

DESCRIPTION OF A PREFERRED EMBODIMENT OF THE INVENTION

The way to implement a solution by means of the method of the invention is described below for the case of a mobile originated call (MO case).

It is convenient to understand the IMS terminal as an entity formed by two elements: the actual UMTS terminal and the IMS client (with the SIP stack). The IMS client is the element managing all IMS signaling and using services of the UMTS terminal (basically the PDP Context support) in order to provide suitable service to the user. When the user requests a PDP Context for signaling, the GGSN provides him or her with a free IP address. The IMS client takes this information from the UMTS terminal and uses it to fill in some obligatory fields in the Registration SIP message (such as the Contact, Route, etc.).

When the recording process has been carried out, the IMS network, specifically the S-CSCF, has created a record in which an association of the IP address assigned with the characteristic identities of the IMS network is included, having the form sip:user@domain. This association is broken when the user is deregistered, therefore it is also eliminated when the PDP Context is deactivated. This same information is also additionally eliminated in the IMS client.

According to the method of the invention, when the GGSN decides to deactivate the inactive PDP Context, an indication is sent to the client and the IMS network. This indication is not considered by these elements, therefore the association established by IMS (IMS identities-IP address) is not eliminated. This means that from the IMS point of view the user continues being registered and available for any type of interaction.

It is therefore the responsibility of the IMS client to maintain the previously mentioned association, but by adding an indication informing of the fact that said association is "fictitious" given that the PDP Context does not actually exist.

When this user makes a call as a generating subject, the activation of a new PDP Context must be requested before sending the appropriate IMS signaling. However that PDP Context request is special given that the IMS client must request that the same IP address saved in the information of the IMS association be assigned. This is achieved by using the field of the PDP Context request message in which the user can request the assignment of a specific IP address from the network. The IMS client must inform the UMTS terminal about the information of the IMS association so that the latter includes the IP address in the suitable field of the PDP Context request.

If this IP address is still free in the GGSN it is reassigned to the user. This is a critical point given that if that IP address has been assigned to another user, it will give a failure of the call attempt, after which the process must be reinitiated.

In relation to this point a small sizing exercise can be carried out in order to attempt to find out the probability that said IP address is still free when the user needs it.

This problem can be partially solved by adopting the policy in the GGSN that when an IP address is freed it is saved in the last position of an IP address line.

The invention claimed is:

1. A method for preventing overload in telecommunications networks with Internet Protocol (IP) Multimedia Subsystem (IMS) by always-on for a call generated by a user, an IMS terminal of said user being formed by a Universal Mobile Telecommunications System (UMTS) terminal and an IMS client;

in which process said user makes a Packet Data Protocol (PDP) Context request and a Gateway General Packet Radio Service (GPRS) Support Node (GGSN) of said network provides said user with a free IP address and the PDP Context becomes active; and wherein an Serving Call Session Control Function (S-CSCF) of the IMS network creates a record in which an association between said IP address and a characteristic identity of the IMS network is included; characterized in that the process comprises the steps of:

when the GGSN is going to deactivate said PDP Context for having been inactive for a predetermined time, an indication of such deactivation is sent to the IMS client which maintains said characteristic IMS identity-IP address association and marks it as fictitious; and, when said user generates a new call, the IMS client informs the UMTS terminal about the characteristic IMS identity-IP address association marked as fictitious, and the UMTS terminal sends a PDP Context request message, in which message the IP address of said IMS association is included in a determined field.

2. A method according to claim 1, wherein if said IP address of the association is still free in the GGSN it is reassigned to the user;
and if said IP address has been assigned to another user, a restart is carried out after the failure of the call attempt.

3. A method according to claim 1 wherein in the GGSN, when an IP address is freed it is saved in the last position of an IP address line.

4. A method according to claim 1 wherein said determined field is a field of the PDP Context request message in which the assignment a specific IP address can be requested from the network.

* * * * *